United States Patent [19]
Starner et al.

[11] Patent Number: 6,046,282
[45] Date of Patent: Apr. 4, 2000

[54] REACTIVE DILUENTS FOR POLYAMIDOAMINE EPOXY CURATIVES

[75] Inventors: William Edward Starner, Nesquehoning; Richard Scott Myers, Kutztown; Andrea Karen Smith, Emmaus, all of Pa.

[73] Assignee: Air Products and Chemicals, Inc., Allentown, Pa.

[21] Appl. No.: 09/003,492

[22] Filed: Jan. 6, 1998

[51] Int. Cl.[7] .................................................. C08L 77/06
[52] U.S. Cl. ........................... 525/432; 528/117; 528/120
[58] Field of Search ............................. 525/432; 528/117, 528/120

[56] References Cited

U.S. PATENT DOCUMENTS

| | | | |
|---|---|---|---|
| 4,728,384 | 3/1988 | Goel | 156/307 |
| 5,017,675 | 5/1991 | Marten et al. | 528/111 |
| 5,114,756 | 5/1992 | Mirabeau et al. | 427/379 |

FOREIGN PATENT DOCUMENTS

| | | |
|---|---|---|
| 663324 | 8/1965 | Belgium . |

OTHER PUBLICATIONS

Chemical Abstracts—65–5465d, vol. 65, Aug. 1966.

*Primary Examiner*—Robert Dawson
*Assistant Examiner*—D. Aylward
*Attorney, Agent, or Firm*—Michael Leach

[57] ABSTRACT

Reactive diluents comprise the amide and/or imidazoline reaction products of low molecular weight carboxylic acids, such as acetic acid, and polyalkyleneamines, such as 2-aminoethylpiperazine (AEP) and triethylenetetramine (TETA). The reactive diluents are prepared by condensation reaction of the carboxylic acid and the polyalkyleneamine at elevated temperature generating a mixture of unreacted polyalkyleneamine, amides and/or imidazolines. The reactive diluent reaction products are used to reduce the viscosity of high viscosity polyamidoamines prepared from fatty dimer acids and polyethyleneamines. Also disclosed is an epoxy composition comprising the epoxy curative composition of a polyamidoamine curing agent reduced in viscosity by the addition of the reactive diluent reaction product and an epoxy resin, such as the diglycidyl ether of bisphenol A.

10 Claims, No Drawings

REACTIVE DILUENTS FOR POLYAMIDOAMINE EPOXY CURATIVES

FIELD OF THE INVENTION

The present invention relates to diluents for epoxy curatives, in particular, reactive diluents for fatty polyamidoamine hardeners.

BACKGROUND OF THE INVENTION

The high viscosity of polyamidoamine epoxy hardeners requires the use of a viscosity reducing additive to lower the curative viscosity and permit more convenient processing. The need for a reactive diluent for high viscosity epoxy curatives is primarily the result of new and anticipated government regulations for environmentally safe products and lower emissions.

Thus, the epoxy industry is in need of a reactive diluent for fatty polyamidoamine hardeners which will reduce viscosity, minimizing or eliminating the use of materials which contribute to volatile organic content (VOC) level in an epoxy coating formulation. Materials which contribute to VOCs are primarily non-reactive solvents. They are currently used to obtain the appropriate formulation viscosity for paint and coating applications.

Viscosity reducing additives have involved the addition of (1) lower viscosity polyethyleneamines such as triethylenetetramine (TETA) or amidoamines (the reaction product polyethyleneamines and monobasic fatty acids), or (2) a non-reactive plasticizer such as phthalate esters or benzyl alcohol, and/or non-reactive diluent such as tertiary amines, aromatic hydrocarbons or alcohols. The viscosity of the entire epoxy formulation is sometimes reduced by adding aliphatic glycidyl ethers, hydrocarbon resins or acrylates to the resin side. Such additives are used to reduce the viscosity of the hardener or resin, and the entire epoxy formulation but at the cost of dry time, and/or at the cost of UV stability, and typically at higher system cost.

Belgian Patent 663,324 (1965) describes the synthesis of 1-aminoalkyl-2-alkyl-2-imidazoline by the reaction of nitriles and polyamines at elevated temperature under pressure. According to the patent the products are suitable as polyepoxy hardeners. However, in contrast, the CA abstract (CA 65-5465d) states the products are plasticizers for polyepoxides.

SUMMARY OF THE INVENTION

The present invention provides reactive diluents for high viscosity (>1000 cPs) polyamidoamine epoxy curing agents, or hardeners, a process for preparing the reactive diluents and compositions employing the reactive diluents. The reactive diluents are the amide and/or imidazoline reaction products of low molecular weight carboxylic acids, such as acetic acid, and polyalkyleneamines (or polyalkylene polyamines), such as 2-aminoethylpiperazine (AEP) and triethylenetetramine (TETA). The reactive diluents are prepared by condensation reaction of the carboxylic acid and the polyalkyleneamine at elevated temperature generating a mixture of unreacted polyalkyleneamine, amides and/or imidazolines.

The reactive diluent reaction products are used to reduce the viscosity of high viscosity polyamidoamines prepared from a fatty dimer acid, a monobasic fatty acid and a polyalkyleneamine, such as the dimer acid of tall oil fatty acid, tall oil fatty acid and TETA. Thus, another embodiment of the invention is an epoxy curative composition comprising the reactive diluent reaction product and a polyamidoamine curing agent.

Yet another embodiment of the invention is an epoxy composition comprising the epoxy curative composition of a fatty polyamidoamine curing agent and an epoxy resin, such as the diglycidyl ether of bisphenol A, reduced in viscosity by the addition of the reactive diluent product.

The reactive diluent for high viscosity amine hardeners according to the invention provides a means to reduce or eliminate the use of volatile non-reactive solvents and/or plasticizers as viscosity reducing agents in epoxy paints and coatings.

Conventional routes to reduce viscosity and VOC of polyamidoamine cured systems typically extend dry time by more than 30%. The balance of dry time and pot life in a lower viscosity polyamidoamine/epoxy system is unique.

DETAILED DESCRIPTION OF THE INVENTION

The reactive diluents of the invention are the amide and/or imidazoline reaction products of low molecular weight carboxylic acids and polyalkylene polyamines (or polyalkyleneamines). The reactive diluents are prepared by condensation reaction of the carboxylic acid and the polyalkylene polyamine at elevated temperature generating a reaction product mixture of unreacted polyalkylene polyamine, amides and/or imidazolines.

Suitable low molecular weight carboxylic acids for making the reactive diluent are the C2–C7 aliphatic carboxylic acids, such as propionic acid and butyric acid, especially acetic acid, and C7–C12 aromatic carboxylic acids, such as benzoic acid.

Any polyalkylene polyamine can be used to prepare the reactive diluent such as polyethylene polyamines and polypropylene polyamines. However, the polyethyleneamines are preferred, especially aminoethyl piperazine (AEP), and others such as diethylenetriamine (DETA), triethylenetetramine (TETA), tetraethylenepentamine (TEPA), and higher molecular weight polyethyleneamine oligomers.

In general, the condensation reaction products are prepared by reacting and generating a salt from the carboxylic acid and polyalkyleneamine, heating the salt and condensing to an amide or an amide/imidazoline mixture with the elimination of water as illustrated by the following reaction of acetic acid and a polyethyleneamine:

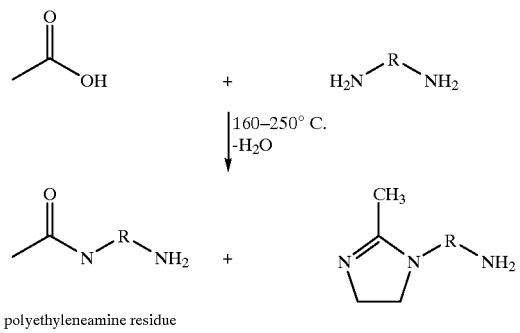

R = polyethyleneamine residue

Using acetic acid and polyethyleneamine for general illustrative purposes, approximately equal molar amounts of acetic acid and polyethyleneamine are mixed together and heated. The temperature is continually raised throughout the process slowly driving off water as the reaction proceeds until the desired amount of water is removed. Vacuum may be employed to assist in the removal of water. The endpoint for the reaction is when a predetermined amount of water has been removed and/or the desired imidazoline to amide ratio (IR ratio) has been reached. The imidazoline/amide ratio (IR ratio) is determined by infrared spectroscopy using the % transmission mode and is typically reported as IR ratio. The peak height of the imidazoline band at 1600 cm$^{-1}$ divided by the peak height of the amide I band at 1670 cm$^{-1}$ determines the IR ratio.

As would be evident to anyone skilled in the art, any reaction temperature and pressure may be used so long as it is adequate for the condensation reaction to occur and the water formed to be removed. The final reaction temperature is determined by the polyethyleneamine used, the pressure used for the reaction, and the amide/imidazoline ratio desired. Particular care must be used if the reaction is conducted under reduced pressure to ensure that the reaction temperature is not such as to distill out the polyethyleneamine.

The IR ratio of the final product is dependent on the amount of water taken out of the reaction mixture. If one mole of water per mole of acetic acid is taken off, the product will be predominantly, if not all, in the amide form. If greater than one mole of water, but less than the maximum of two moles, is removed the product will be a mixture of amide and imidazoline. For this invention, it is desired that at least one mole of water be removed per mole of carboxylic acid used. If the polyethyleneamine used is 2-aminoethyl piperazine (AEP) only one mole of water can be removed per mole of acetic acid because AEP cannot form imidazoline. All other commercially available polyethyleneamines such as diethylenetriamine (DETA), triethylenetetramine (TETA), tetraethylenepentamine (TEPA), higher molecular weight polyethyleneamine oligomers and mixtures thereof have the potential of forming amide/imidazoline mixtures, any or all of which are suitable for this invention.

Combining of the low molecular weight carboxylic acid and polyethyleneamine may be conducted at any practical temperature from subambient to 250° C. The preferred method is to begin the mixing of the reactants at ambient temperature using the heat of reaction to raise the temperature to about the point near where the condensation reaction begins. Ideally, the condensation reaction is conducted at the lowest possible temperature to minimize side reactions and formation of colored bodies. The typical temperature range is 150 to 250° C. with an optimum of about 180–230° C. Atmospheric pressure to about –27 inch (75 mm) Hg is the general operating pressure with the optimum being atmospheric pressure to minimize the loss of polyethyleneamine.

At high temperatures toward the end of the condensation reaction, particularly when reduced pressure is employed, unreacted polyethyleneamine may distill over with the water from the condensation upsetting the thermodynamic equilibrium of the product mix. As polyethyleneamine is removed from the reaction mixture, the equilibrium within the mixture changes leading to the generation of additional free polyethyleneamine and higher molecular weight oligomers. Care must be taken to ensure that significant quantities of polyethyleneamine are not distilled from the product mixture. The free unreacted polyethyleneamine remaining in the product is not detrimental to its performance. The amount of free polyethyleneamine may range from greater than 0 to 25 wt % of the product and the preferred level is from >0 to <10 wt %.

The reactant stoichiometry may range from 0.1 to 2.0 moles of low molecular weight carboxylic acid per mole of polyethyleneamine. The preferred range may be from 0.8 to 1.2 moles of low molecular weight carboxylic acid per mole of polyethyleneamine with the most preferred being 1:1.

The reactive diluent reaction product is a mixture of unreacted amine, amides and imidazolines depending on the polyethyleneamine employed. In the case of AEP, which yields only amides, three amides are generated—the secondary amide (1), tertiary amide (2) and diamide (3).

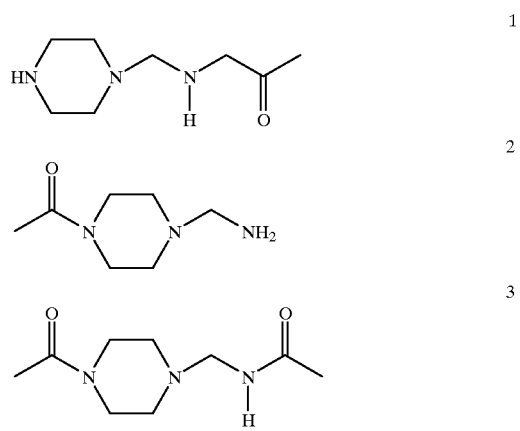

Higher molecular weight polyethyleneamines generate a mixture of unreacted polyethyleneamine, various amide and imidazoline isomers, and combinations containing diamides and diimidazoline and mixtures of the two. The amount and type of mixture is dependent on the reactant stoichiometry and the amount of water removed in the process. The larger the amount of low molecular weight carboxylic acid used above 1:1 stoichiometry or the more polyethyleneamine distilled out with the water, the greater the potential for forming diamide, diimidazoline and mixtures thereof. The more water removed in the process the larger the amount of imidazolines formed.

These reactions are normally conducted without the use of a solvent. However, any solvent may be used which will not react with the reactants or the products and not prove detrimental to the properties of the cured epoxy coating or which can be employed as a processing aid, e.g., to effect the azeotropic removal of water of the reaction. The solvent must have a sufficiently high boiling point so as to permit the condensation reaction to occur yet low enough for removal without detriment to the product or be a suitable additive to the epoxy coating formulation causing no detriment to the properties of the cured polymer. Suitable solvents include toluene and xylene. The preferred method does not employ a solvent for the reaction.

The reactive diluent reaction product may be used to reduce the viscosity of any polyamidoamine hardener. The polyamidoamine based hardener may contain any other components generally used by one skilled in the art, including but not limited to amines, plasticizers, diluents, accelerators, pigments or fillers. The polyamidoamine based hardener can be used to cure any polyepoxide resin typically used in the art such as the diglycidyl ethers of bisphenol A and bisphenol F, and epoxy Novalacs. Reactive glycidyl, hydrocarbon and acrylate diluents may be incorporated into the resin to serve as additional diluents.

Incorporating this type of reactive diluent into a polyamidoamine hardener reduces curative viscosity, subsequently reducing solvent demand necessary for adequate dilution and improving solvent dilution efficiency. By varying the exact composition and level of diluent used, this reduced viscosity polyamidoamine curative composition can be tailored to further optimize reactivity and compatibility with epoxy resin, formulation viscosity/solvent demand, as well as characteristics of the cured coating including film appearance, chemical resistance, hardness, and impact resistance.

The composition of the diluent can be varied by adjusting the amide:imidazoline ratio in the diluent, by adjusting the free amine content in the diluent, and by adjusting the ratio and/or composition of aliphatic amines used in the acid-amide/imidazoline preparation.

A low molecular weight carboxylic acid amide/imidazoline diluent blend imparts significant handling and performance advantages over the base polyamidoamine hardener. For example, when used to dilute a conventional 480 poise polyamide to ~150 poise, the AEP/TETA acetic acid amide/imidazoline diluent blend effects a >15% reduction in dry time while maintaining an adequate pot life.

Compared to the base polyamidoamine, the AEP/TETA acid amide/imidazoline diluent blend imparts significantly improved film appearance and compatibility at shorter induction times. This is evidenced by the higher 20° and 60° specular gloss values for 15 and 30 minute induction times. That these handling and performance advantages can be achieved while maintaining performance characteristic of a polyamidoamine-cured epoxy offers significant latitude in formulating polyamidoamine/epoxy coatings.

Conventional diluent routes to lower viscosity polyamidoamine/epoxy systems do not preserve many of the application benefits of the unmodified polyamidoamine/epoxy systems. Similar advantages are attainable when acetic acid/polyethyleneamine reaction products are used alone to dilute a conventional, 150 poise TETA-dimer-TOFA polyamidoamine.

This reactive dilution approach advantageously effects efficient viscosity reduction while maintaining or improving the majority of handling and performance attributes characteristic of an unmodified polyamidoamine/epoxy system.

The amount of reactive diluent or reactive diluent blend added to the fatty polyamidoamine curative can range anywhere from 5 to 95 wt %, based on polyamidoamine curative. However, to minimize the amount of reactive diluent yet still maintain good viscosity reduction and to maximize the polyamidoamine curative attributes, the recommended level of reactive diluent is 20–40 wt % with the optimum being approximately 30 wt %.

EXAMPLE 1

A 2.0 liter round bottom flask equipped with a nitrogen purge, thermocouple, dropping funnel, Dean Stark collector and condenser, vacuum connection and heating mantle was charged with 878.6 g of TETA (6.0 moles). The temperature was maintained at ambient temperature. With agitation, 396.0 g of glacial acetic acid (6.6 moles) was added over a 30 minute period. The exotherm from the addition caused the temperature to rise from 22° C. to 120° C.

After addition was complete, heat was applied to the reaction mixture to slowly raise the temperature and distill off the water from the condensation reaction. When the reaction temperature reached 200° C., the pressure was slowly reduced to −27 inch (75 mm) Hg. Heating was continued until the IR ratio of the reaction mixture reached 0.9. At this point 178.8 g of distillate was collected containing 99.1 % water.

The reaction mixture was then cooled and the product collected. 1082.6 g of TETA/AcOH amide/imidazoline was obtained (98.7% of theory). The product had an IR ratio of 0.9 and contained 6.6% free TETA by GC, a viscosity of 235.8 cP, an amine value of 840 mg KOH/g and a calculated amine hydrogen equivalent weight (AHEW) of 47.0.

EXAMPLE 2

The TETA/AcOH amide/imidazoline product of Example 1 was mixed at various concentrations with two commercial fatty polyamidoamine products (Ancamide® 350A and Ana-camide 260A polyamidoamine curatives from Air Products and Chemicals, Inc.) to determine the TETA/AcOH amide/imidazoline concentration needed for optimum viscosity reduction. The concentrations used and the resulting viscosities are shown in Table 1. The data shows that when the blend contained between 20 and 40 wt % of Example 1 product, the fatty polyamidoamine content was maximized and the viscosity was near minimum.

TABLE 1

| Wt Parts Ancamide 350A or 260A | Wt Parts Ex 1 TETA/AcOH Amide/Imidazoline | Viscosity (cP) with 350A | Viscosity (cP) with 260A |
|---|---|---|---|
| 0 | 100 | 235.8 | 235.8 |
| 5 | 95 | 319.5 | 304.9 |
| 10 | 90 | 350.2 | 380.1 |
| 15 | 85 | 371.7 | 457.7 |
| 20 | 80 | 398.6 | 594.4 |
| 40 | 60 | 1929 | 4362 |
| 60 | 40 | 2503 | 5744 |
| 70 | 30 | 6543 | 10100 |
| 80 | 20 | 7372 | 13970 |
| 90 | 10 | 9983 | 30410 |
| 100 | 0 | 14700 | 52000 |

EXAMPLE 3

The TETA/AcOH amide/imidazoline product of Example 1 was mixed at various concentrations with Ancamide 220 polyamidoamine to determine the effect of the TETA/AcOH amide/imidazoline concentration on viscosity reduction. The concentrations used and the resulting viscosities are shown in Table 2. From the data it can be seen that the addition of the reactive diluent prepared in Example 1 to Ancamide 220 curative significantly lowers the curative viscosity

TABLE 2

| Wt Parts Ancamide 220 | Wt Parts Ex 1 TETA/AcOH Amide/Imidazoline | Viscosity (cP) with 220 |
|---|---|---|
| 0 | 100 | 235.8 |
| 50 | 50 | 5750 |
| 75 | 90 | 61600 |
| 90 | 10 | 121000 |
| 100 | 0 | 254000 |

EXAMPLE 4

A 4.0 liter round bottom flask equipped with a nitrogen purge, thermocouple, dropping funnel, Dean Stark collector and condenser, vacuum connection and heating mantle was charged with 1815 g of AEP (14.0 moles). The temperature was maintained at room temperature. With agitation, 843 g of glacial acetic acid (14.0 moles) was added over a 60 minute period. The exotherm from the addition caused the temperature to rise from 22° C. to 120° C. After addition was complete, heat was applied to the reaction mixture to slowly raise the temperature and distill off the water from the condensation reaction. The end of the reaction was determined by a low acid value. When the reaction temperature reached 220° C., 361.5 g of distillate containing 251.5 g of water and 110.0 g of AEP was collected and the acid value was 1.4 mg KOH/g. The reaction mixture was then cooled and the product collected. 2276.4 g of AEP/AcOH amide was obtained (99.1% of theory). The product contained 10.2% free AEP by GC, had a viscosity of 2020 cP, and a calculated AHEW of 42.8.

EXAMPLE 5

A blend of 1.25 wt parts of AEP/AcOH amide product of Example 4 and 0.75 wt parts of TETA/AcOH amide/imidazoline product of Example 1 were mixed at various concentrations with Ancamide 220 polyamidoamine to determine the amount of the blend needed for optimum viscosity reduction. The concentrations used and the resulting viscosities are shown in Table 3.

TABLE 3

| Wt Parts Ancamide 220 | Wt Parts of 1.25:0.75 blend AEP/AcOH:TETA/AcOH amide/imidazoline | Viscosity (cP) |
|---|---|---|
| 100 | 0 | 234,000 |
| 90 | 10 | 130,000 |
| 75 | 25 | 58,400 |
| 50 | 50 | 10,000 |
| 25 | 75 | 2,360 |

EXAMPLE 6

A 0.5 liter round bottom flask equipped with a nitrogen purge, thermocouple, dropping funnel, Dean Stark collector and condenser, vacuum connection and heating mantle was charged with 206.4 g of DETA (2.0 moles). The temperature was maintained at room temperature. With agitation, 120.0 g of glacial acetic acid (2.0 moles) was added over a 5 minute period. The exotherm from the addition caused the temperature to rise from 22° C. to 120° C. After addition was complete, the pressure was reduced to –27 inches (75 mm) Hg and heat was applied to the reaction mixture to slowly raise the temperature and distill off the water from the condensation reaction. The end of the reaction was determined by the IR ratio. When the IR ratio reached 1.01 the reaction was stopped. The reaction mixture was then cooled and the product collected. The product had a viscosity of 70.0 cP, an amine value of 758.1 mg KOH/g and a calculated AHEW of 54.0

EXAMPLE 7

A 0.5 liter round bottom flask equipped with a nitrogen purge, thermocouple, dropping funnel, Dean Stark collector and condenser, vacuum connection and heating mantle was charged with 280 g of a mixed polyamine stream (Union Carbide HPA-X; 1.0 moles) containing linear and branched diethylenetriamine, triethylenetetramine, tetraethylenepentamine, pentaethylenehexamine, hexaethyleneheptamine and heptaethyleneoctamine. The temperature was maintained at room temperature. With agitation, 60.0 g of glacial acetic acid (1.0 moles) was added over a 5 minute period. The exotherm from the addition caused the temperature to rise from 22° C. to 85° C. After addition was complete, the pressure was reduced to –27 in (75 mm) Hg and heat was applied to the reaction mixture to slowly raise the temperature and distill off the water from the condensation reaction. The end of the reaction was determined by the IR ratio. When the IR ratio reached 1.58, the reaction was stopped. The reaction mixture was then cooled and the product collected. The product had a viscosity of 904 cP, an amine value of 468.7 mg KOH/g and a calculated AHEW of 46.0

EXAMPLES 8–12

The materials produced in Examples 1 (TETA/AcOH), 4 (AEP/AcOH), 6 (DETA/AcOH) and 7 (HPA-X/AcOH) were each mixed with Ancamide 350A fatty polyamidoamine in a 25:75 weight ratio and the viscosities measured. The results appear in Table 4. In all cases the resulting mixtures were significantly lower in viscosity compared to the fatty polyamidoamine.

TABLE 4

| Example | Reactive Diluent Example | Reactive Diluent | Viscosity (cP) |
|---|---|---|---|
| 8 | 350A alone | none | 14700 |
| 9 | 4 | AEP/AcOH | 10300 |
| 10 | 6 | DETA/AcOH | 3680 |
| 11 | 1 | TETA/AcOH | 5650 |
| 12 | 7 | HPA-X/AcOH | 7530 |

EXAMPLES 13–17

The blends of reactive diluent and Ancamide 350A polyamidoamine prepared in Examples 8–12 were mixed with a stoichiometric amount of Epon 828 bisphenol A type epoxy resin and tested for thin film set time using Gardener BK dry time recorder, and heat of reaction (DSC). After a one hour induction period, 2 mil films were drawn on cold rolled steel. After 24 hours, specular gloss measurements were made to determine curative/epoxy resin compatibility. After 7 days of cure at 25° C. and 50% relative humidity, the films were tested for extent of cure. The results shown in Table 5 show that the presence of the reactive diluent lowers the mix viscosity, increases the curative/epoxy resin compatibility, as seen by increased gloss, and extent of cure without significantly affecting the thin film set time.

TABLE 5

| Ex | Curative Ex | AHEW | Parts per Hundred Resin | Mix Viscosity @ 25° C. cP | Thin Film Set Time hr | 20° Gloss | 60° Gloss | % cure |
|---|---|---|---|---|---|---|---|---|
| 13 | 6 | 100.00 | 53.0 | 17400 | 6.25 | 76.7 | 110.8 | 75.1 |
| 14 | 7 | 111.60 | 59.4 | 14200 | 5.50 | 107.3 | 126.5 | 85.1 |
| 15 | 8 | 82.40 | 43.8 | 8650 | 5.50 | 91.6 | 115.4 | 79.0 |
| 16 | 9 | 78.00 | 41.5 | 10600 | 6.50 | 95.4 | 118.2 | 78.6 |
| 17 | 10 | 77.30 | 41.1 | 13300 | 5.50 | 98.8 | 121.0 | 94.7 |

EXAMPLE 18

A 0.5 liter round bottom flask equipped with a nitrogen purge, thermocouple, dropping funnel, Dean Stark collector and condenser, vacuum connection and heating mantle was charged with 175 g of TETA (1.2 moles). The temperature was maintained at room temperature. With agitation, 78 g of glacial acetic acid (1.3 moles) was added over a 5 minute period. The exotherm from the addition caused the temperature to rise from 22° C. to 120° C. After addition was complete, heat was applied to the reaction mixture to slowly raise the temperature and distill off the water from the condensation reaction. The end of the reaction was determined by a low acid value. When the reaction temperature reached 207° C., 24.1 g of distillate (theoretical yield 23.4 g of water) was collected and the acid value was 1.8 mg KOH/g. The reaction mixture was then cooled and the product collected. 225.9 g of TETA/AcOH amide was obtained (98.7% of theory). The product had an IR ratio of 0.0, indicating no imidazoline had formed, and contained 16.3 % free TETA by GC, a viscosity of 1360 cP, an amine value of 773 and a calculated AHEW of 42.8.

EXAMPLE 19

A 0.5 liter round bottom flask equipped with a nitrogen purge, thermocouple, dropping funnel, Dean Stark collector and condenser, vacuum connection and heating mantle was charged with 175 g of TETA (1.2 moles). The temperature was maintained at room temperature. With agitation, 78 g of glacial acetic acid (1.3 moles) was added over a 5 minute period. The exotherm from the addition caused the temperature to rise from 22° C. to 120° C. After addition was complete, the pressure was reduced to −27 in (75 mm) Hg and heat was applied to the reaction mixture to slowly raise the temperature and distill off the water from the condensation reaction. When the reaction temperature reached 180° C., 35.1 g of distillate was collected. The reaction mixture was then cooled and the product collected. 212.4 g of TETA/AcOH amide/imidazoline was obtained (97.5% of theory). The product had an IR ratio of 0.7 and contained 10.2 % free TETA by GC, a viscosity of 735 cP, an amine value of 805 and a calculated AHEW of 45.7.

EXAMPLE 20

The procedure described in Example 19 was repeated using the same amount of reactants. The reaction was stopped when the IR ratio was 1.5. The product contained 10.2% free TETA by GC, a viscosity of 193 cP, an amine value of 831 mg KOH/g and a calculated AHEW of 46.9.

EXAMPLE 21

The procedure described in Example 19 was repeated using the same amount of reactants. The reaction was stopped when the IR ratio was 2.23. The product contained 9.9% free TETA by GC, a viscosity of 135 cP, an amine value of 832 mg KOH/g and a calculated AHEW of 47.6.

EXAMPLES 22–26

To show the effect of imidazoline/amide ratio (IR ratio) on the properties of an epoxy formulation, the reactive diluent prepared in Example 4 (AEP/AcOH) was blended with the reactive diluents prepared in Examples 18 (TETA/AcOH, IR=0.0), 19 (TETA/AcOH, IR=0.7), 20 (TETA/AcOH, IR=1.5) and 21 (TETA/AcOH, IR=2.2) at varying weight ratios and then mixed with Ancamide 260A curative at a 30 wt % level. Variations in stoichiometry—0.75, 0.85, 1.00 and 1.10 curative to epoxy resin were also employed. These blends were mixed with Epon 828 epoxy resin. The epoxy formulations were cut with a 50/50 n-butanol/xylene diluent to reduce the mix viscosity of the epoxy formulation to 300 cP (a typical mix viscosity used in clear paint coating applications). The composition of each example is given in Table 6. The epoxy formulation viscosities and cured epoxy film properties, thin film set time and dry times were tested and compared to the properties exhibited by the epoxy formulation using Ancamide 260A curative cut to the same 300 cP mix viscosity (Example 22). These results exhibited in Table 7, show that the addition of a reactive diluent lowers the VOC of the formulation regardless of the imidazoline/ amide ratio. Neither the presence of reactive diluent nor the imidazoline/amide ratio has any significant effect on the thin film set time or dry times of the formulation.

TABLE 6

| Ex | Wt Ratio of AEP/AcOH to TETA/AcOH | Stoichiometric Ratio curative:epoxy | AHEW of Curative Mix | Grams of Curative | Grams of Epon 828 Resin | Grams of Solvent |
|---|---|---|---|---|---|---|
| 22 | no diluent | 1.00 | 120.00 | 9.68 | 15.32 | 7.0 |
| 23 | 0.75:1.25 | 0.85 | 84.37 | 7.69 | 17.31 | 6.10 |
| 24 | 1.5:0.5 | 1.10 | 107.17 | 9.02 | 15.98 | 6.32 |
| 25 | 1.0:1.0 | 1.00 | 95.22 | 8.35 | 16.65 | 5.83 |
| 26 | 1.25:0.75 | 0.75 | 87.45 | 7.88 | 17.12 | 6.00 |

TABLE 7

| Ex | Theoretical VOC (lb/gal) | Thin Film Set Time (hr) | Dry Times Dry-to-Touch (hr) | Dry-Hard (hr) |
|---|---|---|---|---|
| 22 | 2.23 | 5.75 | 6.7 | 8.0 |
| 23 | 1.684 | 5.50 | 5.5 | 8.0 |
| 24 | 1.716 | 5.00 | 5.5 | 8.0 |
| 25 | 1.620 | 6.500 | 5.5 | 8.0 |
| 26 | 1.661 | 7.75 | 5.5 | 8.0 |

EXAMPLES 27–31

To show the effect of mixtures of reactive diluents on the properties of the resulting epoxy formulations, the two reactive diluents prepared in Examples 4 (AEP/AcOH) and 18 (TETA/AcOH; IR=0.0) were blended in various proportions with Ancamide 260A curative at levels of 20 (Ex 28), 25 (Ex 29), 30 (Ex 30) and 35 (Ex 31) wt %. Variations in stoichiometry—0.75, 0.85, 1.00 and 1.10 curative to epoxy resin— were also employed. These blends were mixed with Epon 828 epoxy resin. The epoxy formulations were diluted with 50/50 by volume of n-butanol/xylene diluent to reduce the mix viscosity of the epoxy formulation to 300 cP (a typical mix viscosity used in clear paint coating applications). The composition of each example is given in Table 8. The epoxy formulations and cured polymers were tested for thin film set time, dry time, mandrel bend and Koenig hardness. The results were compared to those exhibited by the epoxy formulation using Ancamide 260A curative reduced to the same 300 cP mix viscosity (Ex 27). The test results exhibited in Table 9 show that the addition of reactive diluent to the formulation lowers the VOC and reduces the thin film set time of the formulation without impacting the dry times hardness or flexibility (Mandrel Bend) of the cured epoxy formulation regardless of the reactive diluent composition or the curative to epoxy stoichiometric use ratio.

and condenser, and heating mantle was charged with 436 g of AEP (3.4 moles). The temperature was maintained at room temperature. With agitation, 250 g of propionic acid (3.4 moles) was added over a 60 minute period. The exotherm from the addition caused the temperature to rise from 22° C. to 116° C. After addition was complete, heat was applied to the reaction mixture to slowly raise the temperature and distill off the water from the condensation reaction. The end of the reaction was determined by a low acid value. When the reaction temperature reached 220° C., 61.0 g of distillate was collected. The reaction mixture was then cooled and the product collected. 623.5 g of AEP/PropOH amide was obtained (99.1 % of theory). The product contained 6.8% free AEP by GC, had a viscosity of 700 cP, and a calculated AHEW of 162.

TABLE 8

| Ex | Weight Ratio | Reactive Diluent in Curative (Wt %) | Stoichiometric Ratio (curative:epoxy) | AHEW of Curative Mix | Grams of Curative | Grams of Epon 828 Resin | Grams of Solvent |
|---|---|---|---|---|---|---|---|
| 27 | 0 | 0 | 1.00 | 120.00 | 9.68 | 15.32 | 7.0 |
| 28 | 1.5:0.5 | 20 | 0.75 | 98.19 | 8.52 | 16.48 | 6.9 |
| 29 | 1.0:1.0 | 25 | 1.10 | 99.81 | 8.61 | 16.39 | 6.6 |
| 30 | 0.75:1.25 | 30 | 0.85 | 84.37 | 7.69 | 17.31 | 6.1 |
| 31 | 1.25:0.75 | 35 | 1.00 | 94.09 | 8.28 | 16.72 | 6.12 |

TABLE 9

| | | | Dry Times | | | |
| Ex | Theoretical VOC (lb/gal) | Thin Film Set Time (hr) | Dry-to-Touch (hr) | Dry-Hard (hr) | Konig Hardness | Mandrel Bend |
|---|---|---|---|---|---|---|
| 27 | 2.23 | 5.75 | 6.7 | 8.0 | 105 | no crack |
| 28 | 1.837 | 5.75 | 5.5 | 8.0 | 100.25 | no crack |
| 29 | 1.777 | 5.00 | 5.5 | 8.0 | 100.67 | no crack |
| 30 | 1.684 | 5.50 | 5.5 | 8.0 | 102.67 | no crack |
| 31 | 1.682 | 5.38 | 5.5 | 8.0 | 98.67 | no crack |

EXAMPLE 32

A 1.0 liter round bottom flask equipped with a nitrogen purge, thermocouple, dropping funnel, Dean Stark collector and condenser, vacuum connection and heating mantle was charged with 493.0 g of TETA (3.4 moles). The temperature was maintained at ambient temperature. With agitation, 250.0 g of propionic acid (3.4 moles) was added over a 30 minute period. The exotherm from the addition caused the temperature to rise from 22° C. to 105° C. After addition was complete, heat was applied to the reaction mixture to slowly raise the temperature and distill off the water from the condensation reaction. When the reaction temperature reached 250° C., 75.0 g of distillate was removed and an IR ratio of 0.58 had been reached. The distillate collected contained 99.1% water. The reaction mixture was then cooled and the product collected. 660.0 g of TETA/PropOH amide/imidazoline was obtained (98.7% of theory). The product had an IR ratio of 0.58 and contained 16.8% free TETA by GC, a viscosity of 600 cP and a calculated amine hydrogen equivalent weight (AHEW) of 45.2.

EXAMPLE 33

A 1.0 liter round bottom flask equipped with a nitrogen purge, thermocouple, dropping funnel, Dean Stark collector

EXAMPLE 34

A 1.0 liter round bottom flask equipped with a nitrogen purge, thermocouple, dropping funnel, Dean Stark collector and condenser, vacuum connection and heating mantle was charged with 292.0 g of TETA (2.0 moles) and heated to 120° C. With agitation, 244.0 g of benzoic acid (2.0 moles) was added over a 30 minute period. After addition was complete, heat was again applied to the reaction mixture to slowly raise the temperature and distill off the water from the condensation reaction. When 36.0 g of distillate was removed the reaction mixture was cooled to room temperature and collected. 498.6 g of TETA/BzOH amidelimidazoline was obtained (98.7% of theory). The product contained 6.75% free TETA by GC, a viscosity of 4,900 cP and a calculated amine hydrogen equivalent weight (AHEW) of 68.2.

EXAMPLE 35

The TETA/PropOH, AEP/PropOH and TETA/BzOH amide/imidazolines prepared in Examples 32, 33 and 34, respectively, were mixed 25/75 w/w with typical commercial polyamide curatives, Ancamide 260A and 350A, and the viscosity of the resulting blends determined. As the data in Table 10 shows the addition of the reactive diluents produced in Examples 32, 33 and 34 to a typical commercial polyamide substantially reduced the viscosity of the curative blend.

TABLE 10

| Example | Curative Example | Viscosity (cP @ 25° C.) |
|---|---|---|
| 260A | — | 40,000 |
| 260A + TETA/PropOH | 32 | 12,480 |
| 260A + AEP/PropOH | 33 | 17,222 |
| 260A + TETA/BzOH | 34 | 33,200 |

TABLE 10-continued

| Example | Curative Example | Viscosity (cP @ 25° C.) |
|---|---|---|
| 350A | — | 14,700 |
| 350A + TETA/PropOH | 32 | 6,075 |
| 350A + AEP/PropOH | 33 | 8,768 |
| 350A + TETA/Benzoic | 34 | 12,200 |

EXAMPLES 36–39

To show the effect of the reactive diluents prepared in Examples 32, 33 and 34 on the properties of the resulting epoxy formulations, each reactive diluent was blended at a 25/75 w/w ratio with Ancamide 260A curative. A 1:1 stoichiometry ratio of curative blend to Epon 828 epoxy resin was used. The epoxy formulations were cut with 50/50 by volume of n-butanol/xylene diluent to reduce the mix viscosity of the epoxy formulation to 300 cP (a typical mix viscosity used in clear paint coating applications). The composition of each example is given in Table 11. The epoxy formulations and cured polymers were tested for thin film set time and dry times. The results were compared to those exhibited by the epoxy formulation using only Ancamide 260A curative cut to the same 300 cP mix viscosity (Example 36). The test results exhibited in Table 11, show that the addition of reactive diluent to the formulation lowered the VOC and reduced the thin film set time and dry-to-touch but did not significantly change dry hard time.

EXAMPLES 40–43

To show the effect of the reactive diluents prepared in Examples 32, 33 and 34 on the properties of the resulting epoxy formulations, each reactive diluent was blended at a 25/75 w/w ratio with Ancamide 350A curative. A 1:1 stoichiometry ratio of curative blend to Epon 828 epoxy resin was used. The epoxy formulations were cut with 50/50 by volume of n-butanol/xylene diluent to reduce the mix viscosity of the epoxy formulation to 300 cP (a typical mix viscosity used in clear paint coating applications). The composition of each example is given in Table 12. The epoxy formulations and cured polymers were tested for thin film set time and dry times. The results were compared to those exhibited by the epoxy formulation using only Ancamide 350A curative cut to the same 300 cP mix viscosity (Example 40). The test results exhibited in Table 12 show that the addition of reactive diluent to the formulation lowered the VOC and reduced the thin film set time and dry-to-touch but did not significantly change dry hard time.

TABLE 12

| | | | Grams of | | | | Thin Film | Dry Times | |
|---|---|---|---|---|---|---|---|---|---|
| Ex | Curative Ex | AHEW of Curative Mix | Grams of Curative | Epon 828 Resin | Grams of Solvent | Theoretical VOC (lb/gal) | Set Time (hr) | Dry Touch (hr) | Dry Hard (hr) |
| 40 | 350A | 100.00 | 8.62 | 16.38 | 6.5 | 1.89 | 6.75 | 6.2 | 8.0 |
| 41 | 32 | 76.7 | 7.19 | 17.81 | 5.6 | 1.59 | 5.0 | 4.65 | 8.5 |
| 42 | 33 | 110.6 | 9.20 | 15.80 | 6.0 | 1.65 | 6.5 | 3.55 | 8.0 |
| 43 | 34 | 88.5 | 7.94 | 17.05 | 6.0 | 1.66 | 5.4 | 3.45 | 8.0 |

STATEMENT OF INDUSTRIAL APPLICATION

This invention provides the epoxy market with a reactive diluent for high viscosity polyamidoamine based curatives which will react into the epoxy matrix.

We claim:

1. An epoxy curative composition comprising a high viscosity polyamidoamine epoxy curative and 5 to 95 wt %, based on polyamidoamine curative, of a reactive diluent comprising the amide and/or imidazoline reaction product of a polyalkylene polyamine and a C2–C7 aliphatic monocarboxylic acid or a C7–C12 aromatic monocarboxylic acid.

2. The epoxy curative composition of claim 1 in which the carboxylic acid is acetic acid, propionic acid, butyric acid or benzoic acid.

3. The epoxy curative composition of claim 1 in which the polyalkylene polyamine is a polyethylene polyamine.

TABLE 11

| | | | Grams of | | | | Thin Film | Dry Times | |
|---|---|---|---|---|---|---|---|---|---|
| Ex | Curative Ex | AHEW of Curative Mix | Grams of Curative | Epon 828 Resin | Grams of Solvent | Theoretical VOC (lb/gal) | Set Time (hr) | Dry Touch (hr) | Dry Hard (hr) |
| 36 | 260A | 120.00 | 9.68 | 15.32 | 7.00 | 2.23 | 5.75 | 6.7 | 8.0 |
| 37 | 32 | 84.9 | 7.72 | 17.28 | 6.44 | 1.75 | 3.50 | 4.75 | 8.5 |
| 38 | 33 | 128.3 | 10.07 | 14.93 | 7.15 | 1.87 | 4.50 | 3.75 | 7.00 |
| 39 | 34 | 99.6 | 8.60 | 16.40 | 6.90 | 1.84 | 3.62 | 3.3 | 5.50 |

4. The epoxy curative composition of claim 1 in which the carboxylic acid is acetic acid and the polyalkylene polyamine is a polyethylene polyamine.

5. The epoxy curative composition of claim 4 in which the polyethylene polyamine is aminoethyl piperazine, diethylenetriamine, triethylenetetramine or tetraethylenepentamine.

6. An epoxy curative composition comprising a high viscosity polyamidoamine epoxy curative and 5 to 95 wt %, based on polyamidoamine, of a reactive diluent comprising the amide and/or imidazoline reaction product of acetic acid and a polyethylene polyamine which is aminoethyl piperazine, diethylenetriamine, triethylenetetramine or tetraethylenepentamine reacted in a 0.1–2:1 molar ratio of acid to polyamine.

7. The epoxy curative composition of claim 6 in which the polyethylene polyamine is aminoethyl piperazine.

8. The epoxy curative composition of claim 6 in which the polyethylene polyamine is diethylenetriamine.

9. The epoxy curative composition of claim 6 in which the polyethylene polyamine is triethylenetetramine.

10. The epoxy curative composition of claim 6 in which the reactive diluent is 20–40 wt %, based on polyamidoamine curative.

* * * * *